US012644294B2

(12) United States Patent
Skelton et al.

(10) Patent No.: US 12,644,294 B2
(45) Date of Patent: Jun. 2, 2026

(54) CLAMP ASSEMBLY FOR SCAFFOLDING

(71) Applicant: Adelie, LLC, Schofield, WI (US)

(72) Inventors: Rodney Michael Scott Skelton,
Sherwood Park (CA); Troy Kowalski,
Spruce Grove (CA); **Archie Troy
Lumsden, Rock Hill, SC (US); Chris
Osswald**, Rothschild, WI (US)

(73) Assignee: Adelie, LLC, De Pere, WI (US)

( * ) Notice: Subject to any disclaimer, the term of this
patent is extended or adjusted under 35
U.S.C. 154(b) by 414 days.

(21) Appl. No.: 18/101,882

(22) Filed: Jan. 26, 2023

(65) Prior Publication Data

US 2024/0254784 A1    Aug. 1, 2024

(51) Int. Cl.
*E04G 7/14* (2006.01)
*F16B 7/04* (2006.01)
(52) U.S. Cl.
CPC ............... *E04G 7/14* (2013.01); *F16B 7/048*
(2013.01)
(58) Field of Classification Search
CPC .. E04G 7/22; E04G 7/32; E04G 7/306; E04G
7/307; F16B 7/048; F16B 2/14; Y10T
403/30
See application file for complete search history.

(56) References Cited

U.S. PATENT DOCUMENTS 6,481,912 B2 * 11/2002 Shih ...................... E04G 25/061
403/49
9,133,634 B2 * 9/2015 Brinkmann ............... E04G 7/22
9,683,380 B2 * 6/2017 Brinkmann ............... E04G 1/12
10,119,279 B2 * 11/2018 Brinkmann ............. E04G 7/307
11,208,815 B2 * 12/2021 Rogers ..................... E04G 7/02
2017/0121986 A1 5/2017 Brinkmann et al.
2024/0344340 A1 * 10/2024 Skelton ................... E04G 7/301

FOREIGN PATENT DOCUMENTS

AU    2008 207 593 B2    4/2015
CA    3 006 922 A1    12/2019
CN    207332295 U    5/2018
DE    101 15 232 A1    10/2002
EP    3 363 965 A1    8/2018
EP    3 719 235 A1    10/2020
(Continued)

OTHER PUBLICATIONS

European Patent Office, European Search Report for corresponding
European Patent Application No. 23201385.4, dated Mar. 28, 2024,
8 pages.
(Continued)

*Primary Examiner* — Matthew R McMahon
(74) *Attorney, Agent, or Firm* — Bradley J. Thorson;
DeWitt LLP

(57) ABSTRACT

A clamp assembly adapted for efficient assembly and dis-
assembly of scaffolding includes a pair of pivotally coupled
rotating clamp members and a wedge employed to tempo-
rarily hold the two clamp members in a closed position about
a scaffolding pipe. One of the clamp members has a flange,
and the clamp assembly includes a clevis coupled to a first
scaffolding pipe with the clamp fitting around a second
scaffolding pipe. The flange is received in the clevis, and the
wedge fits through slots formed in the flange and the clevis
to securely couple the first and second scaffolding pipes.

17 Claims, 11 Drawing Sheets

(56)     References Cited

FOREIGN PATENT DOCUMENTS

| JP | 2013194461 A | * | 9/2013 |
| JP | 2022-187085 A | | 12/2022 |
| WO | WO 2011/008094 A1 | | 1/2011 |

OTHER PUBLICATIONS

Korean IP Office, International Search Report and Written Opinion of the International Searching Authority for corresponding PCT/US2023/033863 dated Jan. 31, 2024, 13 pages.
Canadian Intellectual Property Office, Canadian Examination Report for corresponding Canadian Patent Application No. 3,215,494, dated Mar. 21, 2025, 5 pages.

* cited by examiner

CLAMP ASSEMBLY FOR SCAFFOLDING

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention is related to clamp assemblies for scaffolding. More specifically, the present invention relates to clamp assemblies used to couple pipes of a scaffolding assembly together along the same horizontal plane where a node point (i.e., a point where a ledger and a transom connect to a vertical post) does not currently exist.

II. Related Art

Various clamps have been developed which are used in the assembly of scaffolding. Such clamps tend to be relatively expensive and time consuming to use. Such clamps often include two pairs of jaws attached together by a swivel arrangement. The jaws of each pair are typically hinged together so they can be opened and closed. A latch or a nut and bolt arrangement are typically used to temporarily retain the jaws in the closed position. Manipulating the latch can be difficult and deploying the nut and bolt can be time consuming.

While scaffolding has been used for centuries, the need still exists for a clamp that is inexpensive to manufacture and able to be efficiently deployed without any specific tools other than those readily available at a job site where the scaffolding is assembled. Likewise, there is the need for such a clamp that is easily decoupled when disassembling or reconfiguring the scaffolding.

SUMMARY OF THE INVENTION

The present invention solves the foregoing problems by providing clamp assemblies comprising a first clamp member, a second clamp member, a pin, and a wedge. The first clamp member comprises a first c-shaped jaw having a concave inside surface, a convex outside surface, a first end, and a second end. The first clamp member also includes a first flange projecting radially from the convex outside surface adjacent the first end of the first c-shaped jaw and a pair of pin supports extending parallel to each other from the convex outside surface at a location between the first end and the second end. The first clamp member also has an elongate slot. This elongate slot has a first slot portion extending through a portion of the first flange adjacent the first edge and a second slot portion extending though the first c-shaped jaw from the first end just past and between the pin supports. The two pin supports have aligned pin receiving bores.

The second clamp member comprises a connector, an engagement member, a tab, and an arm extending between the connector and the engagement member. The connector has a central orifice and the connector, arm, and tab form a concave engagement surface. The connector and the arm are adapted to reside within the elongate slot with the connector between the two pin supports and the central orifice in axial alignment with the pin receiving bores. The pin is inserted through the two pin receiving bores and the central orifice to pivotally couple together the first clamp member and the second clamp member.

The tab serves at least two functions. First, a wedge can be inserted through the portion of the elongate slot in the flange and reside against the tab to lock the first and second clamp members in the closed position. Second, when the wedge is removed, the tab is easily gripped to assist with opening the two clamp members.

Features may be added to the clamp. For example, a second flange with a second slot may be added to the first clamp member. A connecting tube (collar) may also be added. Such additional features allow a single clamp to couple additional scaffolding pipes together.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts.

DETAILED DESCRIPTION

Figure 1:
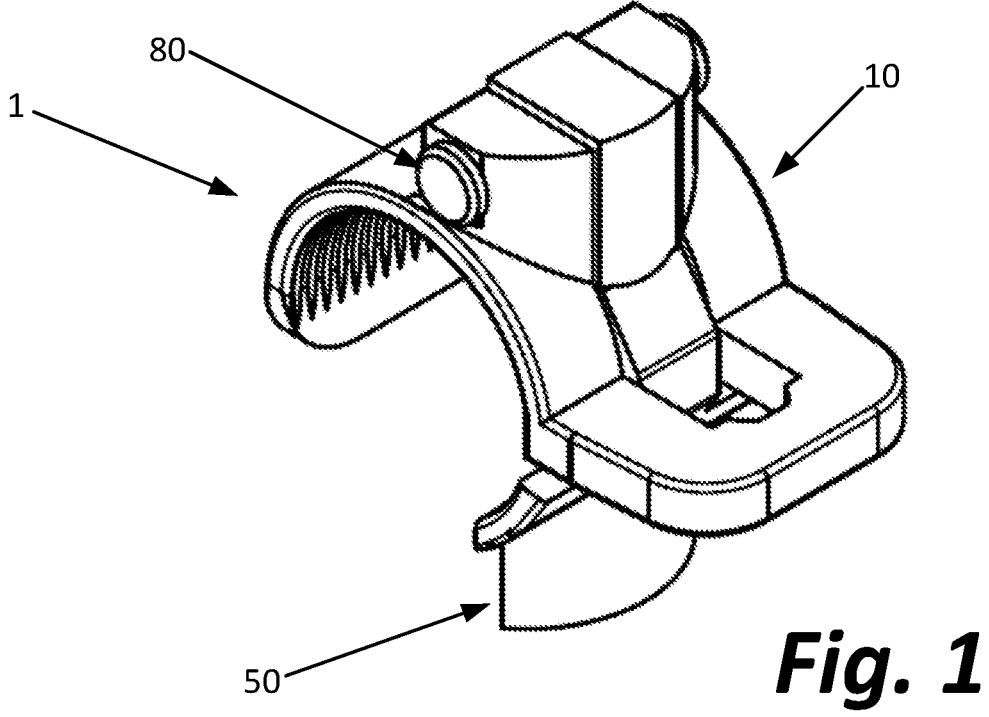
FIG. 1 is a perspective view of an exemplary clamp assembly made in accordance with the present invention with first and second clamp members in their closed position.
Figure 2:
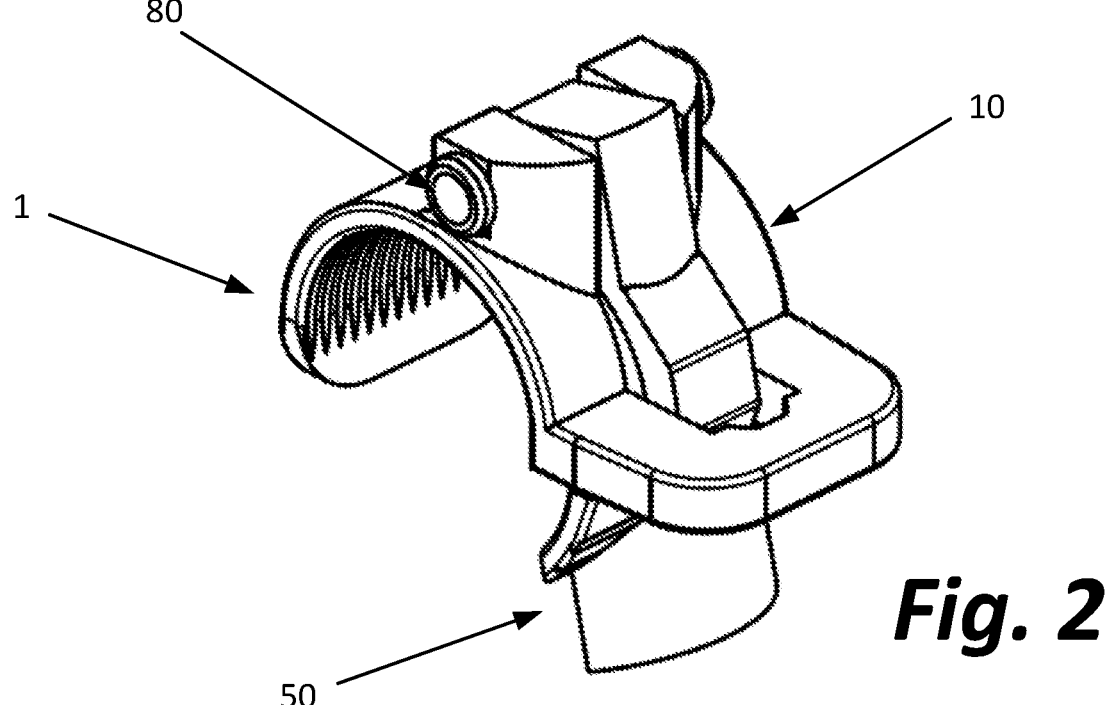
FIG. 2 is a perspective view of the exemplary clamp assembly of FIG. 1 with first and second clamp members in their open position.
Figures 3, 4:
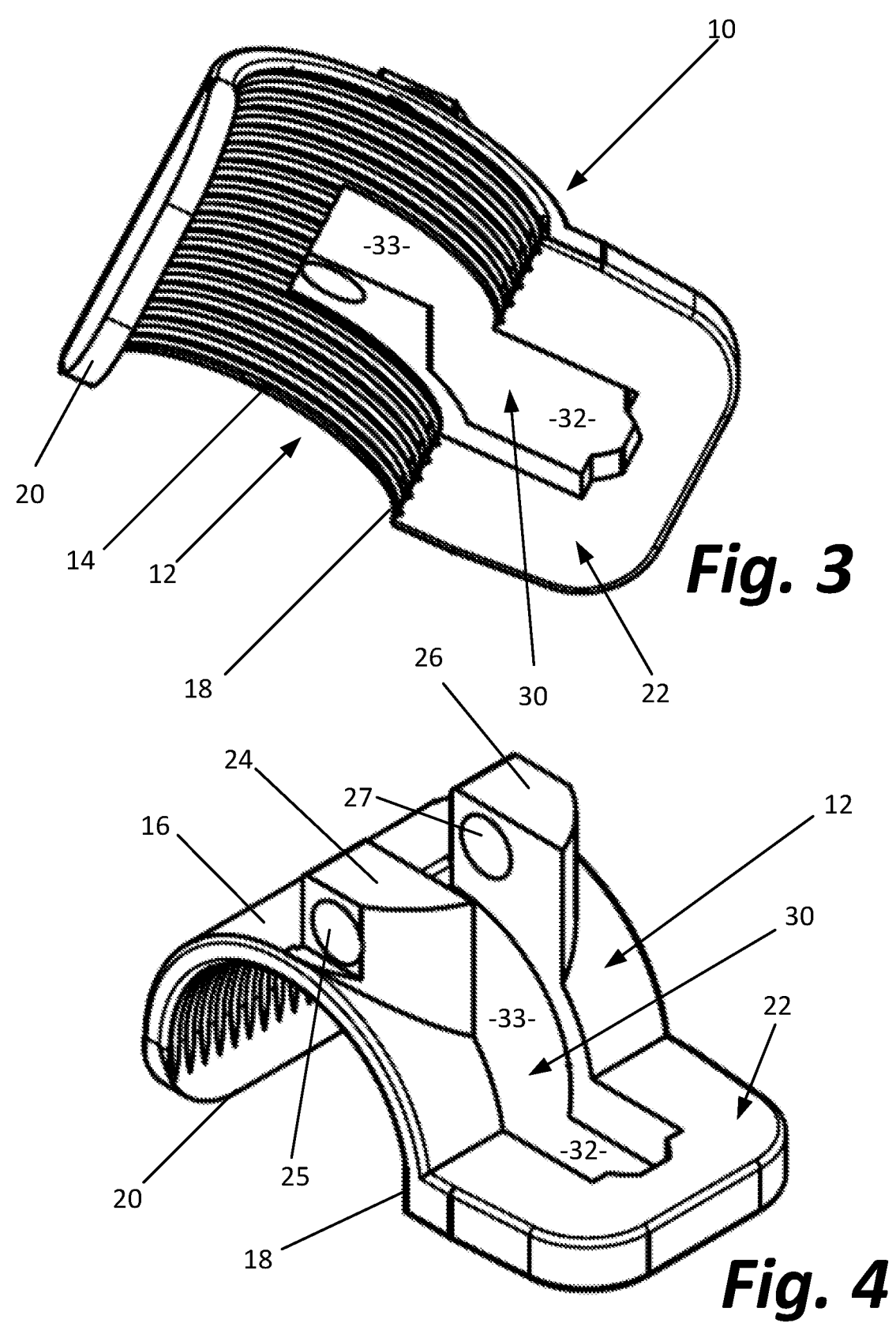
FIG. 3 is a first perspective view of the first clamp member of the clamp assembly of FIG. 1.
FIG. 4 is a second perspective view of the first clamp member of the clamp assembly of FIG. 1.
Figures 5, 6:
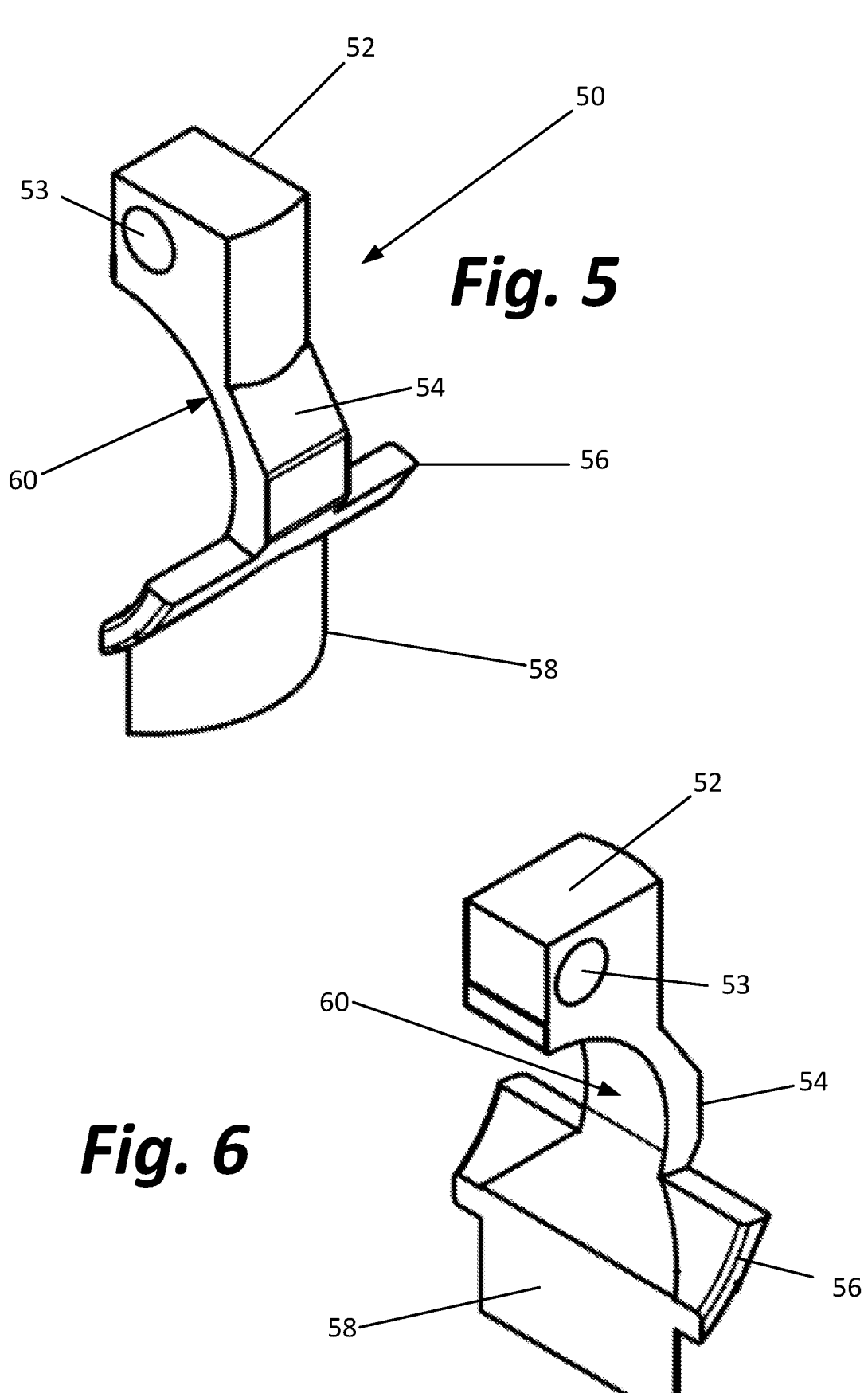
FIG. 5 is a first perspective view of the second clamp member of the clamp assembly of FIG. 1.
FIG. 6 is a second perspective view of the second clamp member of the clamp assembly of FIG. 1.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

A clamp assembly 1 made in accordance with the present invention is shown in FIGS. 1-6. The clamp assembly 1 includes a first clamp member 10, a second clamp member 50, a pin 80.

The first clamp member 10 comprises a first c-shaped jaw 12 having a concave inside surface 14, a convex outside surface 16, a first end 18, and a second end 20. The first clamp member 10 also includes a first flange 22 projecting radially from the convex outside surface 16 adjacent the first end 18 of the first c-shaped jaw 12 and a pair of pin supports 24 and 26 extending parallel to each other from the convex outside surface 16 at a location between the first end 18 and the second end 20. The first clamp member 10 also has an elongate slot 30. This elongate slot 30 has a first slot portion 32 extending through a portion of the first flange 22 adjacent the first end 18 and a second slot portion 33 extending though the first c-shaped jaw 12 from the first end 18 to a location adjacent to and between the pin supports 24 and 26. The two pin supports 24 and 26 have aligned pin receiving bores 25 and 27.

The second clamp member 50 comprises a connector 52, an engagement member 56, a tab 58, and an arm 54 extending between the connector 52 and the engagement member 56. The connector 52 has a central orifice 53. The connector 52, arm 54, and engagement member 56 form a concave engagement surface 60. The connector 52 and the arm 54 are adapted to reside within the elongate slot 30 with the connector 52 between the two pin supports 24 and 26 and the central orifice 53 in axial alignment with the pin receiving bores 25 and 27. The pin 80 is inserted through the two pin receiving bores 25/27 and the central orifice 53 to pivotally couple the first clamp member 10 and the second clamp member 50 together. Given this arrangement, the clamp members 10 and 50 can be rotated relative to each other about the pin 80 between the closed, clamping position shown in FIG. 1 and the open, unclamped position shown in FIG. 2.

Figures 7, 8:
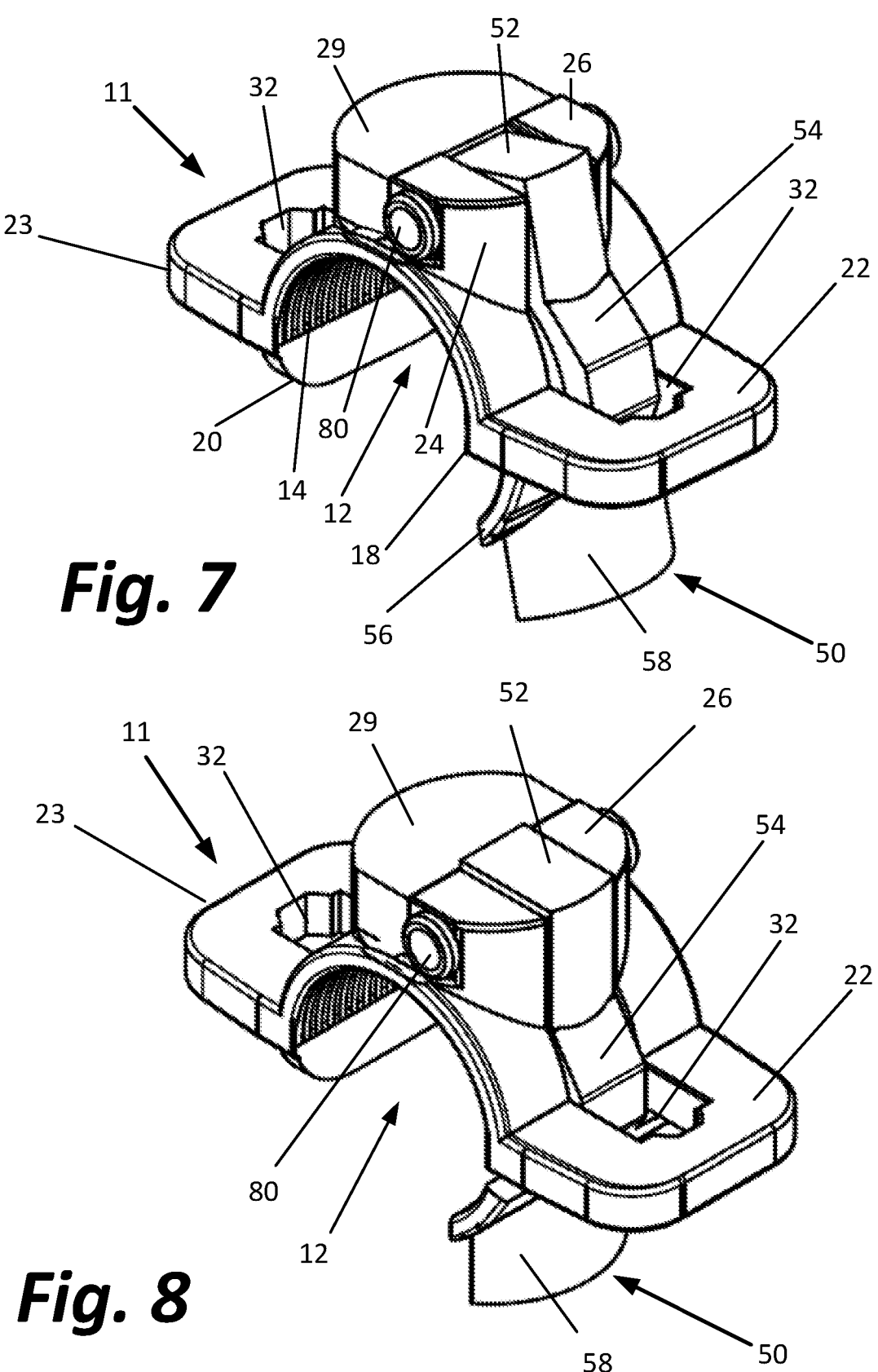
FIG. 7 is a first perspective view of an alternative embodiment of a clamp made in accordance with the present invention in its open position.
FIG. 8 is a second perspective view of clamp of FIG. 7 in its closed position in its open position.

FIGS. 7 and 8 show an alternative first clamp member 11. The alternative first clamp member 11 has all the same features as the first clamp member 10 but includes two flanges 22 and 23 rather than one. Both flanges 22 and 23 have an open portion 32. A second clamp member 50 is coupled to the first clamp member 11 and operates in the same manner as was the case with the embodiment shown in FIGS. 1-6. The alternative clamp member 11 also includes an additional support 29.

Figure 9:
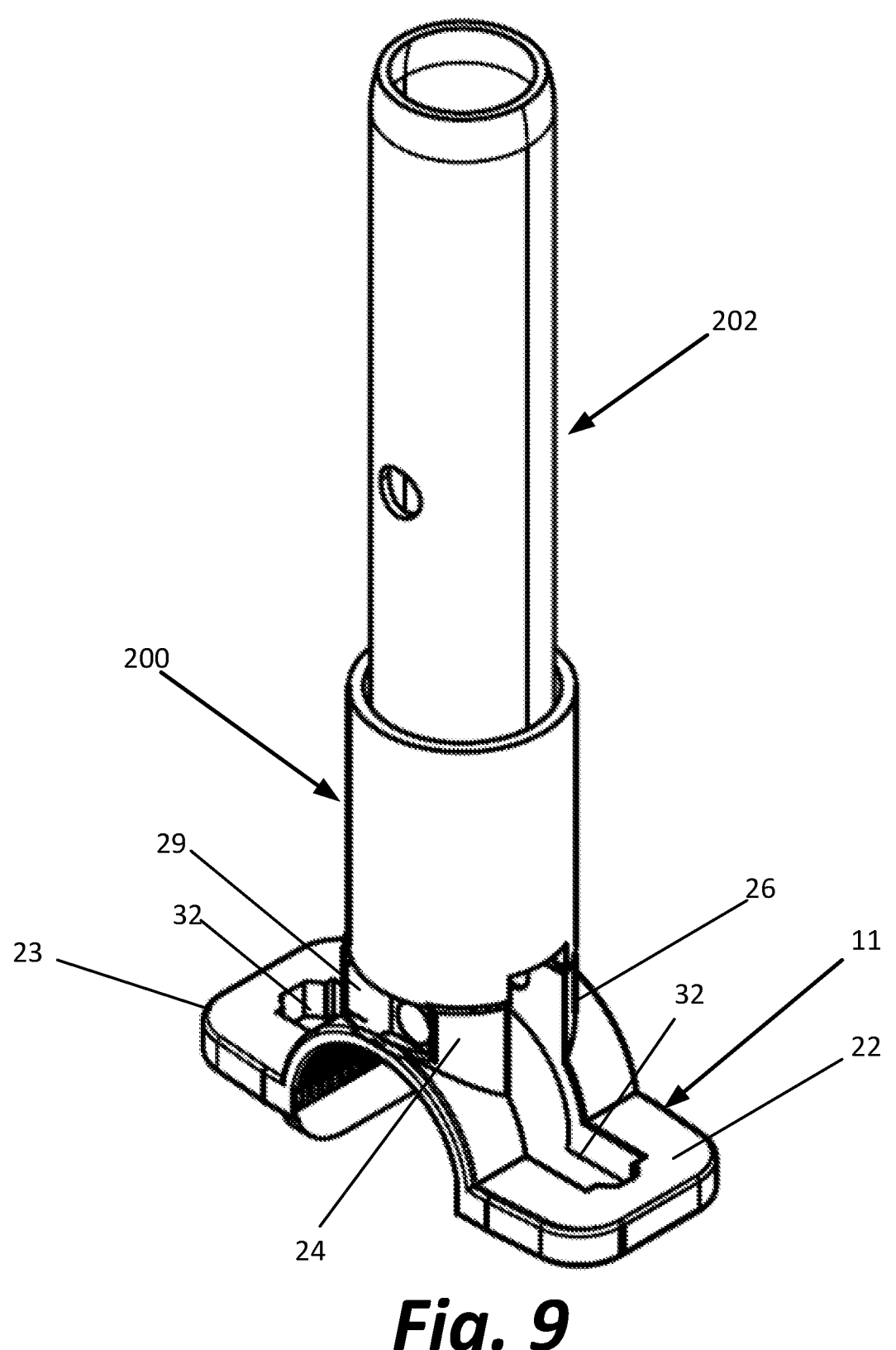
FIG. 9 is a perspective view of an assembly comprising the first clamp member of the clamp of FIG. 7 coupled to a collar and spigot.
Figures 10, 11:
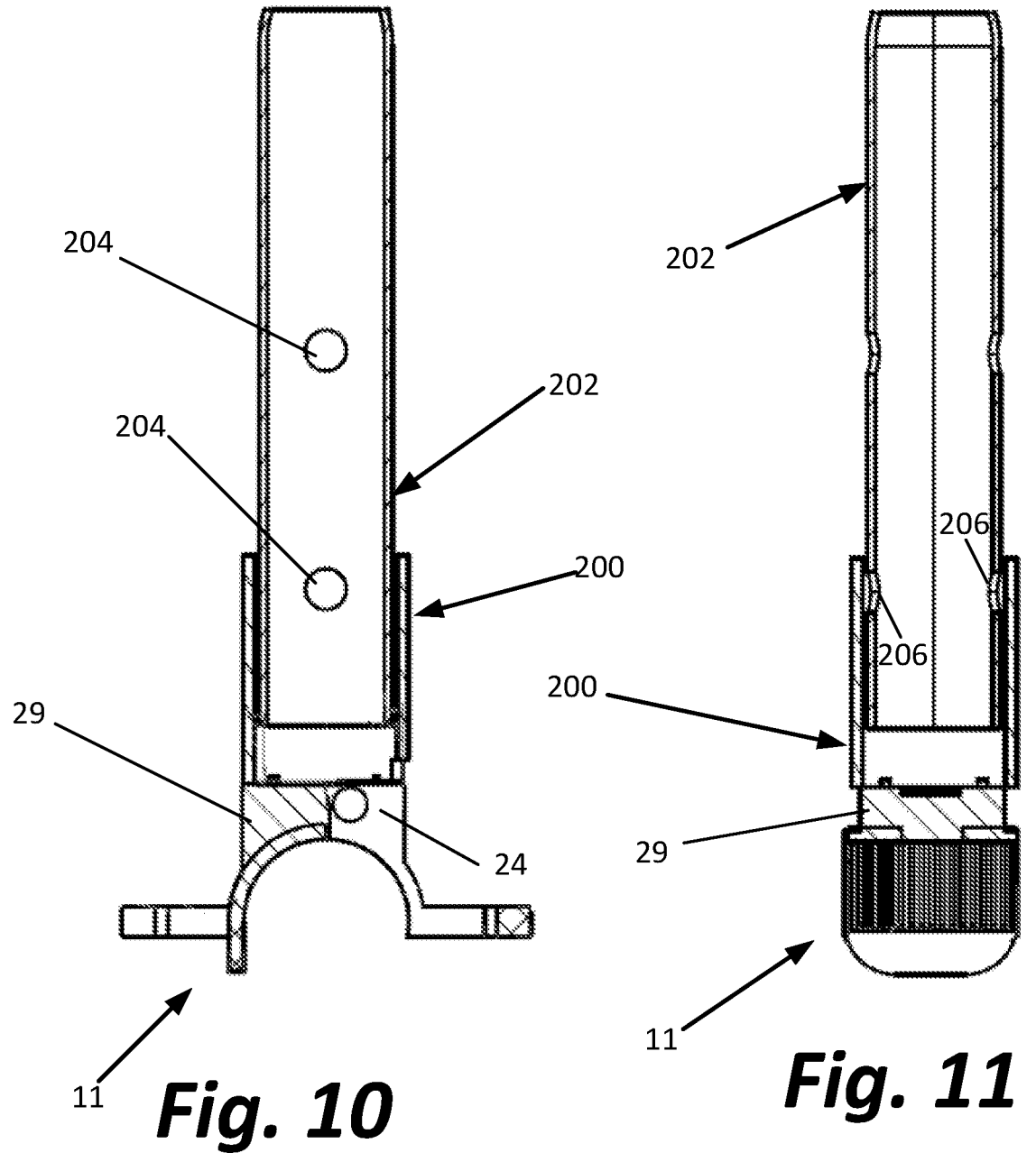
FIG. 10 is a first cross-sectional view of the assembly of FIG. 9.
FIG. 11 is a second cross-sectional view with the assembly of FIG. 9 with the assembly rotated 90 degrees relative to the cross-sectional view of FIG. 10.

FIGS. 9 through 11 show a second alternative embodiment in which pin supports 24 and 26 and the additional support 29 cooperate to provide a connecting member. This connecting member results in a solid connection between the clamp and a coupling tube (collar) 200. Coupling tube 200 extends perpendicular to the flanges 22 and 23 and is adapted to mate with a spigot 202. As illustrated, the spigot 202 has a plurality of holes 204 extending through the spigot 202. The coupling tube 200 may be provided with detents 206 adapted to mate with holes 204 to lock the coupling tube 200 and spigot 202 together when they are mated. While FIGS. 9-11 show the spigot 202 inserted into the coupling tube 200, the spigot may alternatively be adapted to receive the coupling tube 200. When this alternative arrangement is employed, the detents 206 extend from the exterior of the wall of the coupling tube 200 rather than from the interior was of the coupling tube 200. In still other embodiments, the detents 206 may extend from the spigot 202 and be adapted to mate with openings in the wall of the coupling tube 200. While two detents adapted to mate with a pair of holes are shown, additional detents and holes may be employed. Also, while alternative means may be employed to lock the coupling tube 200 and the spigot 202 together, the arrangement shown makes it easier to do so and eliminates the need for additional parts to perform this function.

Use of the clamps will now be explained with reference to FIG. 12. When the embodiment of FIGS. 1-6 is employed, a pipe 101 is inserted into the clamp between the first clamp member 10 and the second clamp member 50. Then, the first flange 22 is inserted between the between the arms of a first clevis 102 joined to a first scaffolding pipe 100. The first slot portion 32 of flange 22 is aligned with a first channel extending through the first clevis 102. A wedge 104 is then inserted into the first channel and first slot portion 32. The wedge 104 serves two functions. First, the wedge locks the first flange 22 and the clevis 102 of the first pipe 100 together. Second, the wedge 104 holds the first clamp member 10 and the second clamp member 50 in the locked position shown in FIG. 1 about the pipe 101. The wedges 104 can be pounded into a tight friction fit within portion 32 of slot 30 using only a hammer. The wedge 104 can also be removed using a hammer.

The first and second clamp members 10 and 50 are designed so that the concave surfaces 14 and 60 tighten around the pipe 101 without causing structural deformation as the wedge 104 is hammered into first slot portion 32. Without the concave surfaces 14 and 60, the structural integrity of pipe 101 could be compromised.

Tab 58 serves two functions in each of the embodiments shown in the drawings. First, the wedge 104 inserted through the portion 32 of the elongate slot 30 in the flange 22 resides against the tab 58 to lock the first and second clamp members 10 and 50 in the closed position shown in FIG. 1. Second, when the wedge 104 is removed, the tab 58 is easily gripped to assist with opening the two clamp members, i.e., pivot them relative to each other to the open, unclamped position shown in FIG. 2. Additionally, tab 58 allows for full engagement of both the upper arm and lower arm of the clevis 102 of first pipe 100 capturing the complete strength of clevis 102 as it was designed to be used. Tab 58, by being fully engaged by wedge 104 extending through the portion 32 of the elongate slot 30 in the flange 22 and the channel through clevis 102, removes stress that would otherwise be placed on pin 80. Instead, such vertical and horizontal stresses are shifted to other components of the clamp assembly 1.

When the embodiment of FIGS. 7 and 8 is used, a second pipe 100 having a second clevis 102 may also be coupled to the clamp by inserting the second flange 23 between the arms of the second clevis, aligning the second slot 32 of flange 23 with a second channel extending through the second clevis, and inserting a wedge 104 into the second channel and second slot portion 32. As such, when the embodiment of FIGS. 7 and 8 is used, a single clamp holds two pipes 100 along a common longitudinal axis and a third pipe 101 between the first clamp member 11 and the second clamp member 50 so that the third pipe 101 extends in a direction normal to that longitudinal axis shared by the two pipes 100.

Figure 12:
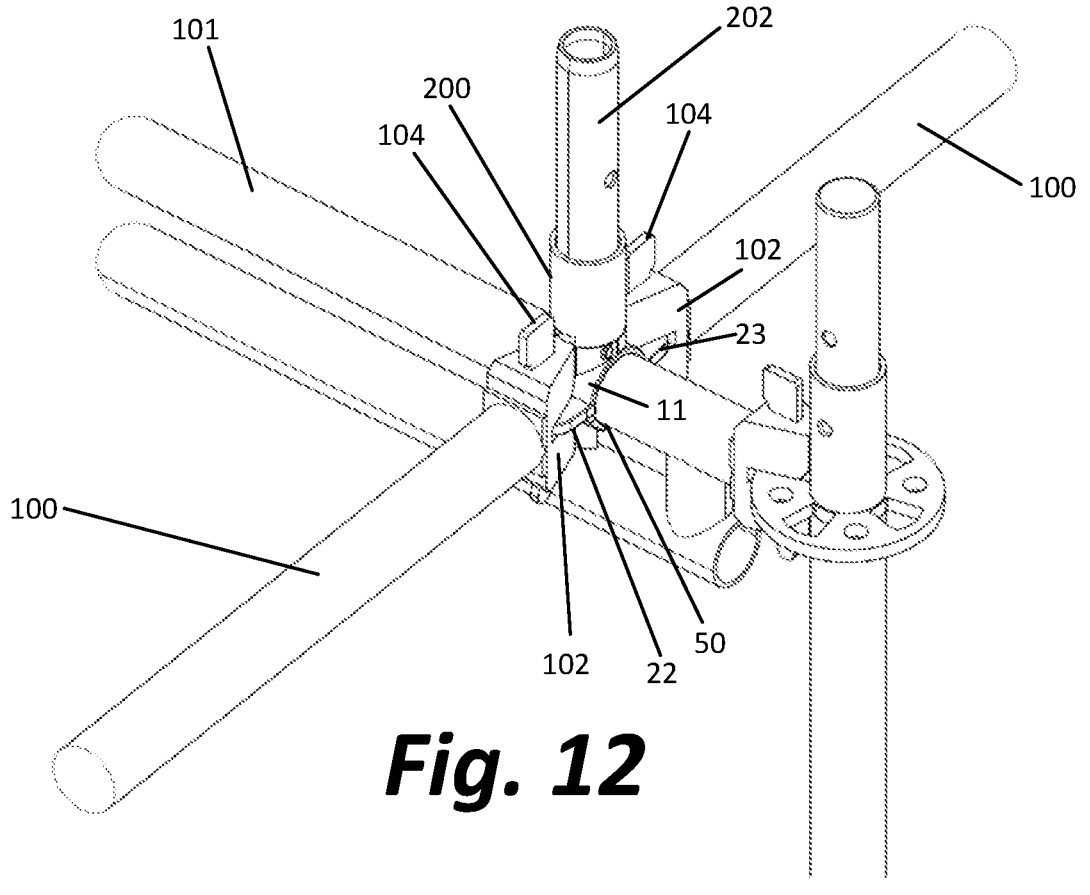
FIG. 12 is a perspective view showing how the assembly of FIG. 9 may be employed to fasten multiple scaffolding pipes together.
Figures 13, 14:
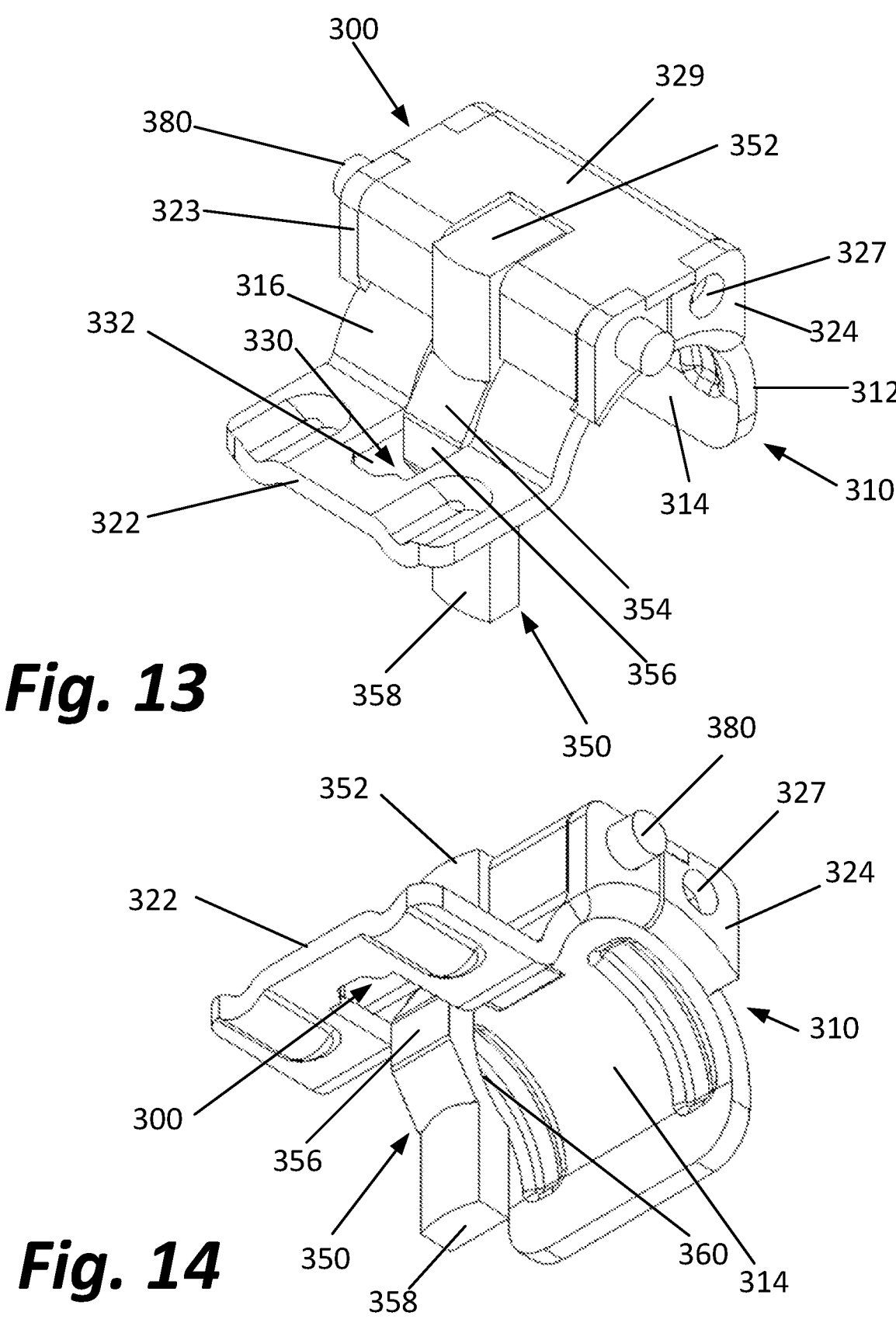
FIG. 13 is a top isometric perspective view of an alternative embodiment of the clamp assembly of the present invention.
FIG. 14 is a bottom isometric perspective view of the clamp assembly of FIG. 13.

As shown in FIG. 12, a single clamp made in accordance with the embodiment of FIGS. 9-11 may be used to couple three pipes together as described above, and these three pipes may further be coupled to a spigot 202.

Alternative means other than a clevis may be employed to secure the first clamp member to a first scaffolding pipe (support member) of a scaffolding assembly such as a weld, a plurality of detents, connecting hinge pins, or in other techniques well known to those of ordinary skill in the art.

FIGS. 13 through 17 show another clamp assembly 300 that, in principle, operates in a fashion like the clamp assemblies describes above but having additional features allowing this clamp assembly to be easily coupled to a spigot.

Figure 18:
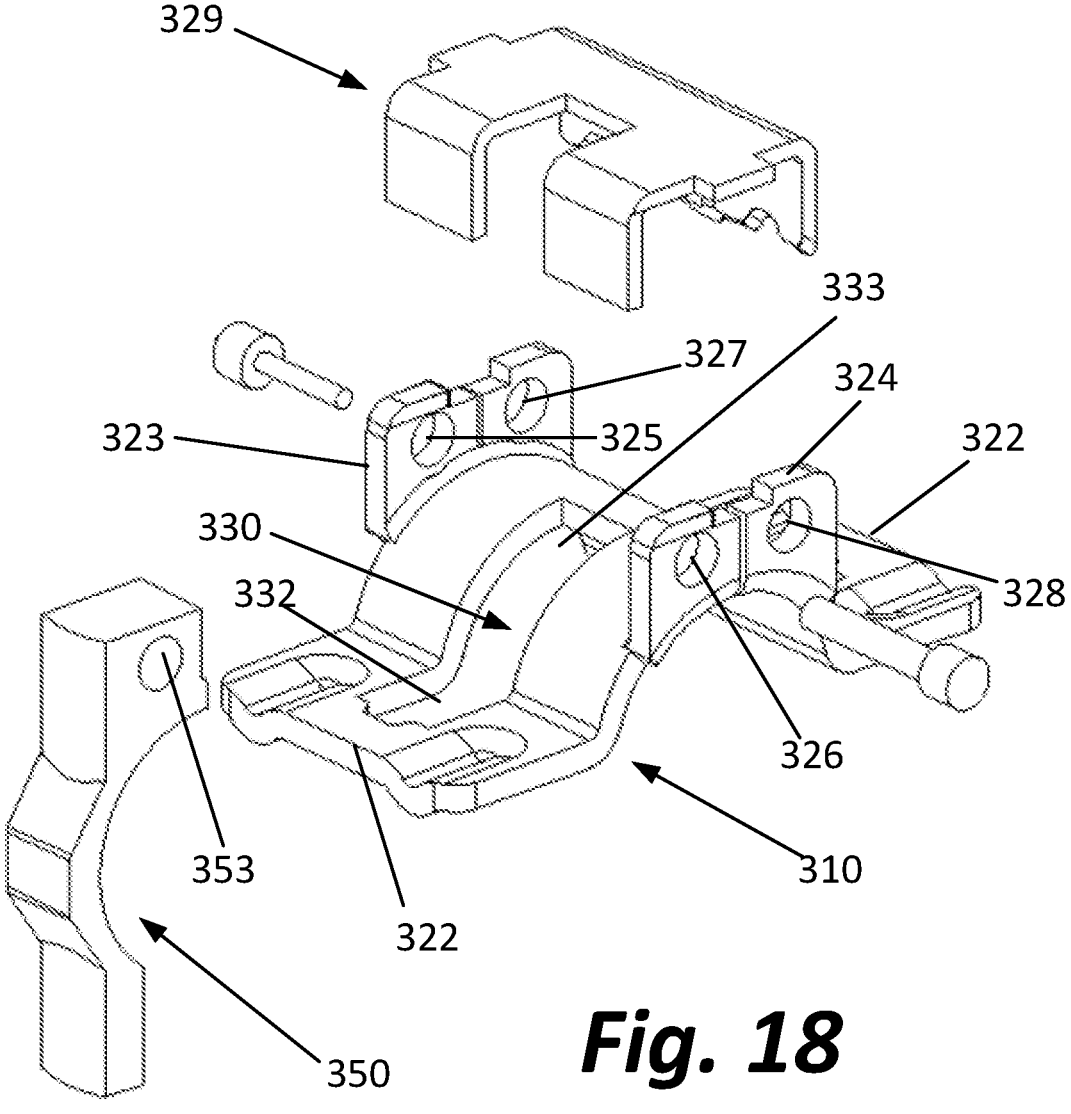
FIG. 18 is an exploded perspective view of still another embodiment of the clamp of the present invention wherein the first clamp member comprises a pair of flanges.

The clamp assembly 300 has a first clamp member 310 comprising a C-shaped jaw 312 with a concave inside surface 314 and a convex outside surface 316. Extending from at least one side of the C-shaped jaw is a flange 322. The first clamp member 310 may also be provided with a pair of flanges 322 extending in the opposite directions from the C-shaped jaw 312 as shown in FIG. 18. In such a case, these flanges are employed like the flanges 22 and 23 shown in FIGS. 7 through 12.

The first clamp member also has an elongate slot 330 having a first portion 332 extending through one of the flanges 332 and a second portion 333 extending through the C-shaped jaw 312. A pair of mounting members 323 and 324 extend from the convex outside surface 316 of the first clamp member 310. The mounting members 323 and 324 project parallel to each other from opposite edges of the first clamp member 310. The mounting members 323 and 324 have aligned axle holes 325 and 326 and aligned lock holes 327 and 328. The first clamp member shown also includes a top cap 329 defining a hollow space between the mounting members 323 and 324, a portion of the convex outside surface 316 and the top cap 329. The top cap 329 serves to distribute any force applied to the clamp thereby reducing the risk that mounting members 323 and 324 will be bent or break.

The clamp assembly 300 also includes a second clamp member 350 comprising a connector 352 having a central orifice 353. The second clamp member further comprises an arm 354, an engagement member 356, and a tab 358. The engagement member 356 comprises a least a portion of a concave engagement surface 360. The first clamp member 310 and the second clamp member 350 are assembled to form the clamp assembly 300 by extending the connector 352 through the elongate slot 330 and aligning the central orifice 353 with the axle holes 325 and 326. A pin 380, which acts as an axle allowing the first and second clamp members to pivot relative to each other, is then extended through the axle holes 325 and 326 and the central orifice 353. The pin 380 is long enough to extend beyond the outer sides of the mounting members 323 and 324.

Figures 15, 16:
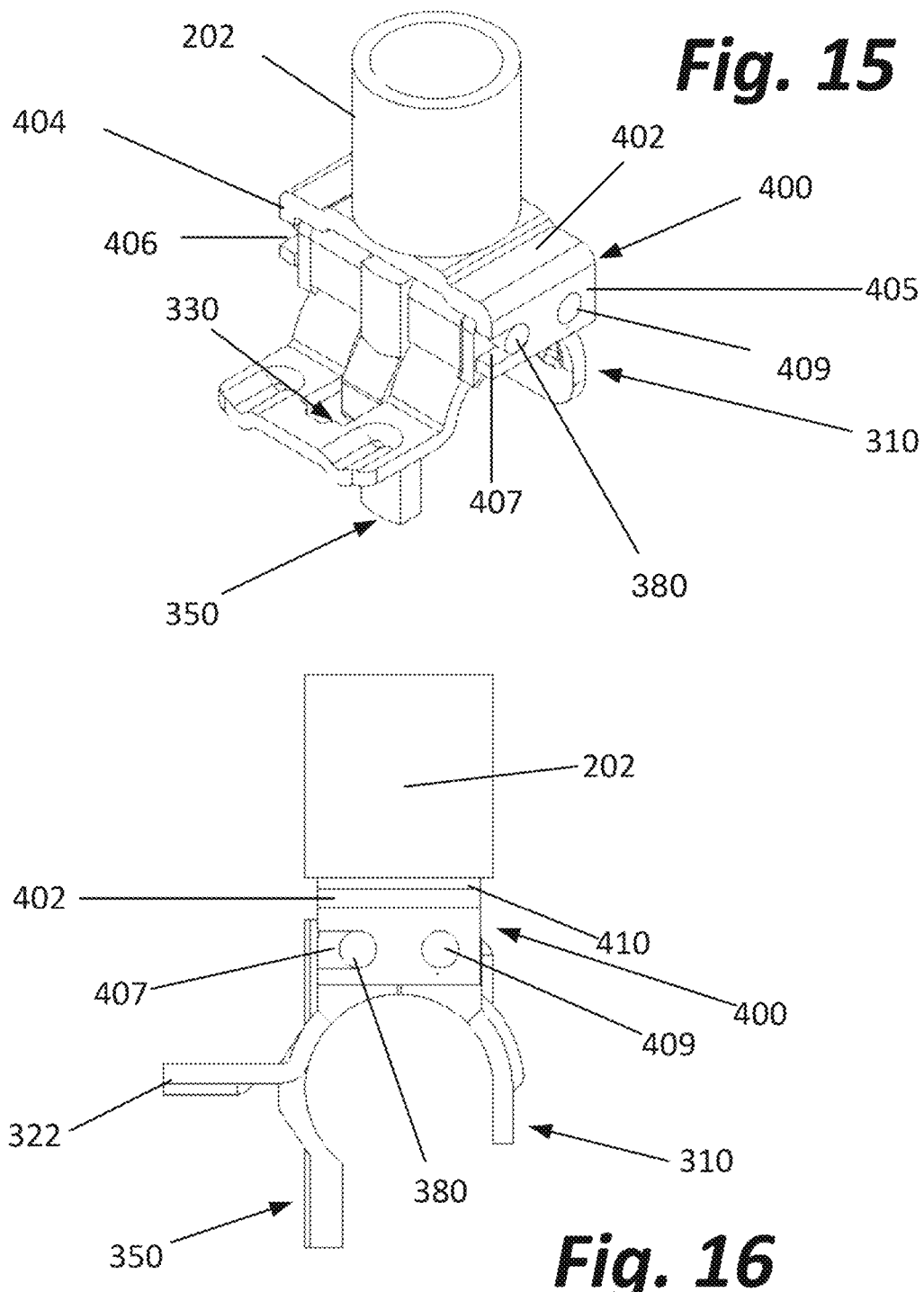
FIG. 15 is a top isometric perspective view of an assembly comprising the clamp assembly of FIG. 13 coupled to a spigot attachment.
FIG. 16 is a side view of the assembly of FIG. 15.
Figure 17:
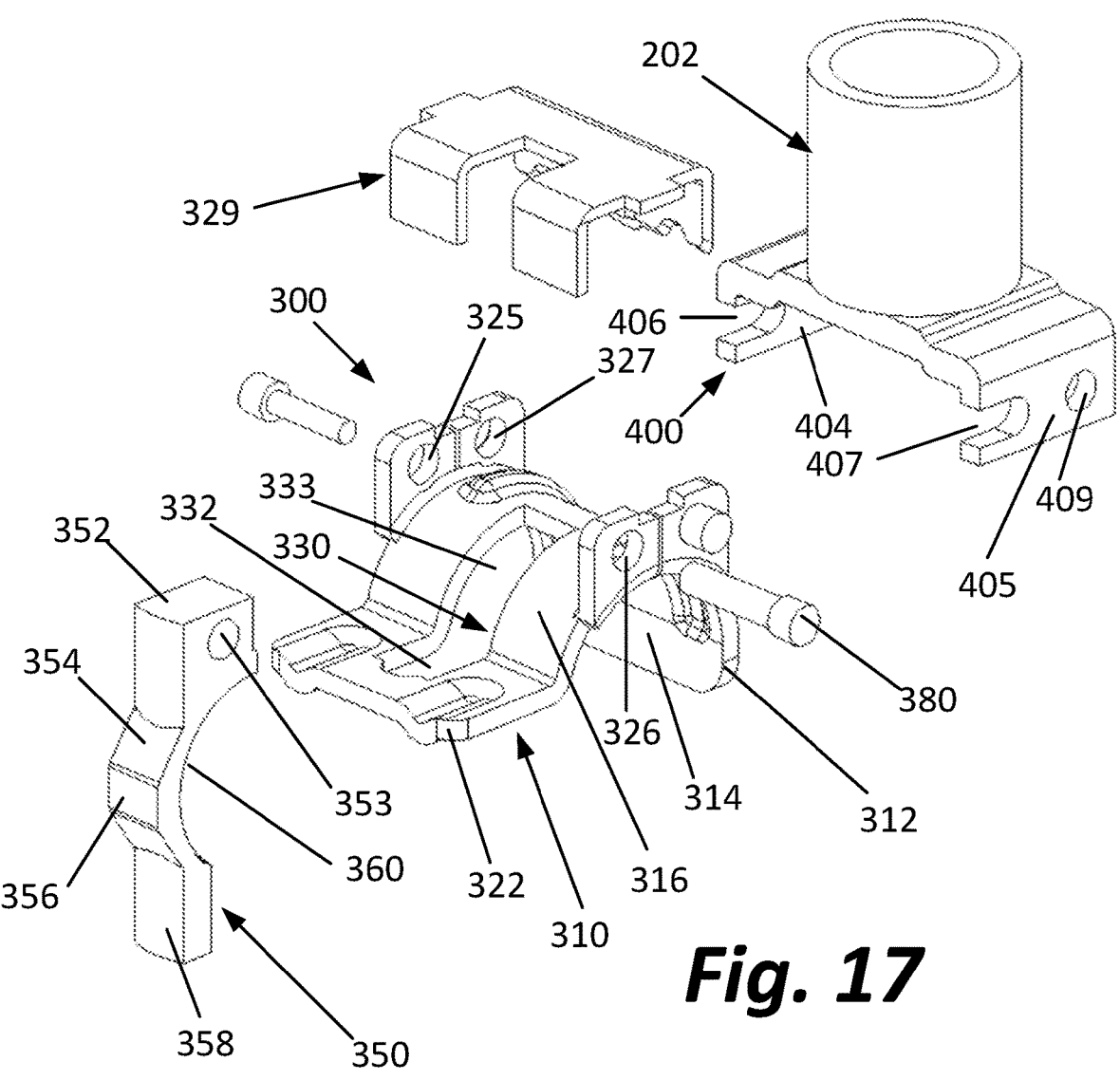
FIG. 17 is an exploded perspective view of the assembly of FIG. 15.

FIGS. 15 through 17 show a way a spigot 202 may be attached to the clamp assembly 300. Specifically, a bracket 400 is provided. Bracket 400 includes a main plate 402 adapted to extend across the top cap 329. The bracket 400 also includes a pair of side plates 404 and 405 extending perpendicular to, and in a first direction from, the main plate 402. These side plates 404 and 405 are adapted to extend parallel to each other and on outside of the mounting members 323 and 324. Each side plate 404 and 405 includes a forward slot 406/407 and a side plate bore (only one of which is depicted in the figures at 409). Extending perpendicular to, and in a second direction from, the main plate is a coupling tube 410. The coupling tube is adapted to mate with a spigot such as the spigot 202.

When a spigot is to be attached, the bracket 400 is fitted over the top cap 329 and mounting members 323 and 324. The bracket 400 is then slid into position so the opposite ends of the pin 380 are positioned within the forward slots 406 and 407, and the side plate bores 409 are aligned with lock holes 327 and 328. A locking member may then be inserted to extend through the side plate bores 409 and lock holes 327 and 328 to lock the bracket 400 to the clamp assembly. The locking member may be of the same construction as the pin 380, a nut and a bolt, a cotter pin, or any other suitable lock pin. In some instances, it may be preferable to employ a lock pin having a head at one end and a detent at the other such that no tools are required to couple and uncouple the bracket 400 relative to the clamp assembly 300. A spigot may be mated with or otherwise coupled to the coupling tube 410 either before or after the bracket 400 is assembled with the clamp assembly 300.

Various modifications may be made without deviating from the invention. For example, a plurality of ridges and valleys may be formed in the concave inside surface 14 of the c-shaped jaw 12. The wedge 90 may be tapered, with either smooth surfaces or with surfaces having a plurality of ridges and valleys formed therein and extending in a direction perpendicular to the longitudinal axis to further aid in locking. The various components may be made of any suitable metal or may be molded from any suitable plastic material. The first clamp member may be provided with a collar adapted to receive the end on a scaffolding support and the collar may have features, such as bolt holes that aid with such attachment. Two clamps of any type described above may be provided with the first clamp members joined together by a weldment fixing the position of the two clamps together. A hinge or other similar arrangement allowing the two clamps to rotate with respect to each other may also be employed. Similarly, a dual clamp arrangement may be provided with the flanges coupled together or made integral with each other.

Within the scope of the following claims, the invention may be practiced otherwise than as specifically shown in the drawings and described above. The foregoing description is intended to explain the various features and advantages but is not intended to be limiting. The scope of the invention is defined by the following claims which are also intended to cover a reasonable range of equivalents.

What is claimed is:

1. A scaffolding clamp assembly for coupling scaffolding pipes comprising:

(a) a first clamp member having (i) a first c-shaped jaw comprising a concave inside surface, a convex outside surface, a first end, and a second end, (ii) a first flange, and (iii) an elongate slot having a first slot portion extending through a portion of the first flange;

(b) a second clamp member, said second clamp member comprising an arm and a concave engagement surface, the arm adapted to reside within the elongate slot, said second clamp member pivotally coupled to the first clamp member and adapted for rotation relative to the first clamp member between an open position and a closed position;

(c) a first clevis, the first clevis adapted to be coupled to a first horizontal pipe, wherein the first clevis comprises a pair of arms and defining a first channel extending through the first clevis, wherein said first flange is adapted to be inserted between the arms of the first clevis such that the first slot portion is aligned with the first channel extending through the first clevis; and (d) a wedge adapted to be inserted into the first slot portion to hold the second clamp member in the closed position around a second horizontal pipe that is received between the first clamp member and the second clamp member, and thereby locking the first flange to the first clevis.

2. The clamp assembly of claim 1 further comprising a bracket adapted to couple a spigot to the first clamp member.

3. The clamp assembly of claim 1 wherein at least one of the first clamp member and the second clamp member is made of metal.

4. The clamp assembly of claim 1 wherein at least one of the first clamp member and the second clamp member is made of plastic.

5. The clamp assembly of claim 1, wherein the first clamp member further comprises a second flange with a second slot extending through the second flange, the clamp assembly further comprising a second clevis having a pair of arms and defining a second channel extending through the second clevis, wherein the second flange is adapted to be inserted between the arms of the second clevis such that the second slot is aligned with the second channel extending through the second clevis.

6. The clamp assembly of claim 5 further comprising a second wedge, said second wedge adapted to be inserted into the second channel of the second clevis and said second slot extending through the second flange to lock the second flange to the second clevis.

7. The clamp assembly of claim 1 wherein the first clamp member further comprises a coupling tube.

8. A scaffolding clamp assembly for coupling scaffolding pipes comprising:

(a) a first clamp member having (i) a first c-shaped jaw comprising a concave inside surface, a convex outside surface, a first end, and a second end, (ii) a first flange, (iii) a first elongate slot having a first slot portion extending through a portion of the first flange, (iv) a second flange, and (v) a second slot extending through the second flange;

(b) a second clamp member, said second clamp member comprising an arm and a concave engagement surface, the arm adapted to reside within the elongate slot, said second clamp member pivotally coupled to the first clamp member and adapted for rotation relative to the first clamp member between an open position and a closed position;

(c) a first clevis, the first clevis adapted to be coupled to a first horizontal pipe, wherein the first clevis comprises a pair of arms and a defining a first channel extending through the first clevis, wherein said first flange is adapted to be inserted between the arms of the first clevis such that the first slot portion is aligned with the first channel extending through the first clevis;

(d) a first wedge adapted to be inserted into the first slot portion to hold the second clamp member in the closed position around a second horizontal pipe that is received between the first clamp member and the second clamp member, and thereby locking the first flange to the first clevis; and (e) a spigot and a bracket adapted to couple the spigot to the first clamp member.

9. The clamp assembly of claim 8, further comprising a second clevis having a pair of arms and defining a second channel extending through the second clevis, wherein the second flange is adapted to be inserted between the arms of the second clevis such that the second slot is aligned with the second channel extending through the second clevis wherein said second flange is adapted to be inserted between the arms of the second clevis so that the second channel is aligned with the second slot.

10. The clamp assembly of claim 9 further comprising a second wedge, wherein said second wedge is adapted to extend through the second channel and the second slot to couple said second clevis to said second flange.

11. The clamp assembly of claim 8 wherein said bracket comprises a coupling tube.

12. The clamp assembly of claim 11 wherein said coupling tube is adapted to receive an end of the spigot.

13. The clamp assembly of claim 11 wherein said coupling tube has at least one detent.

14. A clamp assembly comprising:

(a) a first clamp member having (i) a first c-shaped jaw comprising a concave inside surface, a convex outside surface, a first end, and a second end, (ii) a first flange, (iii) a first elongate slot having a first slot portion extending through a portion of the first flange and a second slot portion extending through a portion of the first c-shaped jaw, (iv) a second flange, and (v) a second slot extending through the second flange;

(b) a second clamp member, said second clamp member comprising an arm and a concave engagement surface, the arm adapted to reside within the elongate slot, said second clamp member coupled to the first clamp member and adapted for rotation relative to the first clamp member between an open position and a closed position;

(c) a first clevis comprising a pair of arms and defining a first channel extending through the first clevis, wherein the first flange is adapted to be inserted between the arms of the first clevis such that the first slot portion is aligned with the first channel extending through the first clevis;

(d) a second clevis comprising a pair of arms and defining a second channel extending through the second clevis, wherein the second flange is adapted to be inserted between the arms of the second clevis such that the second slot is aligned with the second channel extending through the second clevis;

(e) a first wedge adapted to be inserted into the first slot portion and the first channel to lock the first and second clamp members in the closed position and the first flange to the first clevis; and (f) a second wedge adapted to be inserted into the second slot and second channel to lock the second flange to the second clevis.

15. The clamp assembly of claim 14 further comprising a connecting tube coupled to the first clamp member.

16. The clamp assembly of claim 14 further comprising a first pipe coupled to the first clevis, a second pipe coupled to the second clevis, and a third pipe held between the first clamp member and the second clamp member.

17. The clamp assembly of claim 14 further comprising a first pipe coupled to the first clevis, a second pipe coupled to the second clevis, a third pipe held between the first clamp member and the second clamp member, a connecting tube, and a spigot coupled to the connecting tube.

\* \* \* \* \*